(12) United States Patent
Collette et al.

(10) Patent No.: US 7,308,001 B2
(45) Date of Patent: Dec. 11, 2007

(54) FIBRE CHANNEL FRAME BATCHING FOR IP TRANSMISSION

(75) Inventors: William Collette, Stillwater, MN (US); Bret Ketchum, Anoka, MN (US); Richard Kelley, Corcoran, MN (US); Robert Engebretson, Medina, MN (US); Mark Moran, Woodbury, MN (US); Mike Morandi, St. Paul, MN (US)

(73) Assignee: Computer Network Technology Corporation, Minneapolis, MN (US)

( * ) Notice: Subject to any disclaimer, the term of this patent is extended or adjusted under 35 U.S.C. 154(b) by 1023 days.

(21) Appl. No.: 10/295,359

(22) Filed: Nov. 15, 2002

(65) Prior Publication Data

US 2003/0118047 A1   Jun. 26, 2003

Related U.S. Application Data

(60) Provisional application No. 60/332,186, filed on Nov. 16, 2001.

(51) Int. Cl.
    *H04J 3/16* (2006.01)
(52) U.S. Cl. .......................... 370/471; 370/473
(58) Field of Classification Search ......... 370/465–474
    See application file for complete search history.

(56) References Cited

U.S. PATENT DOCUMENTS

| | | | |
|---|---|---|---|
| 5,541,911 A | 7/1996 | Nilakantan | |
| 5,758,085 A | 5/1998 | Konoheris | |
| 6,400,730 B1 * | 6/2002 | Latif et al. | 370/466 |
| 6,847,644 B1 * | 1/2005 | Jha | 370/392 |
| 7,089,293 B2 * | 8/2006 | Grosner et al. | 709/217 |
| 7,106,751 B2 * | 9/2006 | Miyamoto et al. | 370/401 |
| 2002/0156924 A1 * | 10/2002 | Czeiger et al. | 709/249 |
| 2003/0091000 A1 | 5/2003 | Chu | |
| 2003/0115447 A1 | 6/2003 | Pham | |
| 2003/0193950 A1 | 10/2003 | Philips | |
| 2005/0220110 A1 | 10/2005 | Agarwal | |

OTHER PUBLICATIONS

Byte and Switch, Cisco Readies Multiprotocol Switch, www.byteandswitch.com, Sep. 17, 2004.
Information Sciences Institute, Univ. of Southern California, Jon Postel, Internet Protocol, Darpa Internet Program Protocol Specification, Sep. 1981, http://rfc.sunsite.dk/rfc/rfc791.html.
Abraham Shacham et al., IP Payload Compression Protocol (IPComp)., Sep. 2001, http://rfc.sunsite.dk/rfc/rfc3173.html.

* cited by examiner

*Primary Examiner*—Chi Pham
*Assistant Examiner*—Thai Hoang (57) ABSTRACT

A storage router and related method are presented for combining multiple Fibre Channel frames together into a single IP datagram for tunneling transmission over an Internet protocol network. The storage router operates by storing incoming Fibre Channel frames in a Fibre Channel frame buffer. When there is sufficient data in the buffer, multiple Fibre Channel frames are taken from the buffer and combined into a single IP datagram. The number of Fibre Channel frames to be combined can be established through a variety of tests, including total bytes of data, number of frames, or through a time-out mechanism. The network layer then fragments the datagram into data link level frames, such as 1500 byte Ethernet frames. When the IP datagram arrives at the final destination, the segmented IP datagram is reconstructed, and the multiple Fibre Channel frames are extracted from the IP datagram and passed on to the recipient Fibre Channel network.

12 Claims, 5 Drawing Sheets

*Figure 1*

*Prior Art*

*Figure 2*

*Prior Art*

FIBRE CHANNEL FRAME BATCHING FOR IP TRANSMISSION

This application claims priority to provisional patent application U.S. Ser. No. 60/332,186, filed on Nov. 16, 2001, which is hereby incorporated by reference.

FIELD OF THE INVENTION

This invention relates to the field of Fibre Channel data transmission over IP networks. More particularly, the present invention relates to a system and method for batching a plurality of Fibre Channel frames into a single IP datagram for transmission over an IP network.

BACKGROUND OF THE INVENTION

Computers and other host devices are often connected with one or more storage devices via a storage area network (or "SAN"). It is well known to establish such networks using the Fibre Channel protocol, which is well suited for transmitting storage data over networks due to its ability to carry different networking and channel protocols. For instance, it is possible to transmit channel protocols such as SCSI (Small Computer System Interface) or HIPPI (High Performance Parallel Interface) over Fibre Channel links.

The Fibre Channel communications protocol is generally considered to involve five independent layers (Fibre Channel-0, Fibre Channel-1, Fibre Channel-2, Fibre Channel-3, and Fibre Channel-4). Fibre Channel-0 covers the physical characteristics that allow communications over a variety of physical media, such as copper wiring or fiber optics. The Fibre Channel-1 layer defines the 8B/10B transmission coding developed by Widmer and Franasak of IBM. The Fibre Channel-2 layer defines the Fibre Channel framing and signaling protocol. Fibre Channel-3 defines various link service functions. The Fibre Channel-4 level defines the implementation of the different protocols that can be carried over the Fibre Channel connection, such as SCSI or HIPPI.

Figure 1:
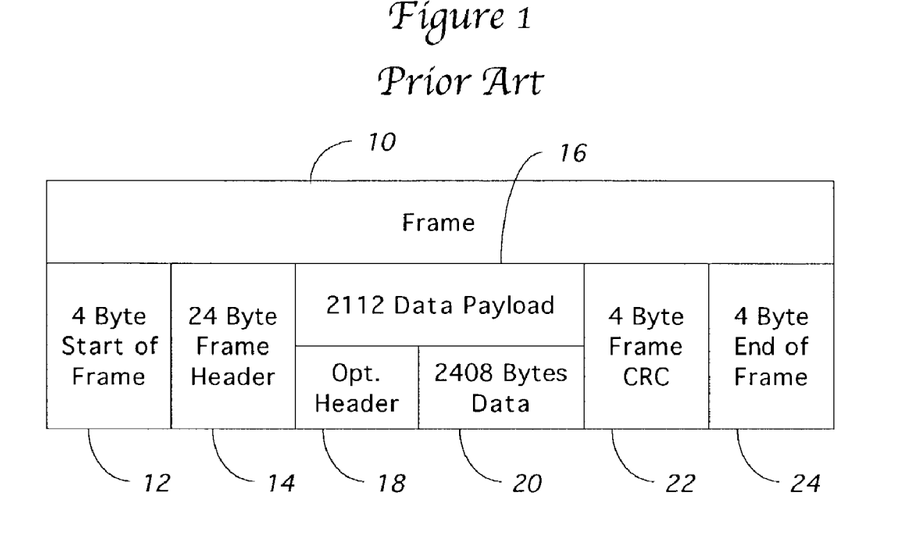
FIG. 1 is a schematic diagram showing elements found within a Fibre Channel frame.

The Fibre Channel-2 layer defines the Fibre Channel frame 10 as shown in FIG. 1. A frame 10 always starts with an ordered set (a specially defined four byte grouping that cannot be mistaken for data) that is known as the start-of-frame delimiter 12. Following this start-of-frame ordered set 12 is a 24-byte frame header 14 that contains basic information about the frame 10, including the type of data being transmitted, a sequence ID, a sequence count indicating the position of frame 10 in the sequence 30, and an exchange ID identifying the exchange 40 to which the sequence 30 belongs. After the frame header 14 is the 2112-byte data payload 16, which contains the actual data being transmitted. In some circumstances, optional headers 18 of up to sixty-four bytes are included in data payload 16 with along with 2048 bytes of actual data 20. Following the data payload 16 is the frame CRC value 22 and the end of frame ordered set 24. The Fibre Channel-2 layer also defines a Fibre Channel sequence as one or more related frames 10 flowing in the same direction on a link and a Fibre Channel exchange as one or more sequences used to complete a single communication operation.

Fibre Channel based storage area networks are generally limited to campus-sized environments as a result of Fibre Channel's 10 kilometer distance limitation. Recent technology developments have been proposed that would allow these localized SANs to be connected together over Internet protocol (IP) networks. An organization known as the Internet Engineering Task Force (IETF) has helped to develop the specifications for one such technology. This technology, known as Fibre Channel over IP (FCIP or Fibre Channel/IP), enables the tunneling of Fibre Channel data between SANs over IP networks. The FCIP technology relies upon the transport layer (such as TCP) for congestion control and management and relies upon both the transport layer and the Fibre Channel protocol for data error and data loss recovery.

The FCIP specification tunnels Fibre Channel data by embedding each Fibre Channel frame 10 within a single IP datagram. This one-to-one relationship is possible because the maximum size of an encapsulated Fibre Channel frame 10 will not exceed 2148 bytes, while an IP datagram (according to IPv4 as defined in RFC 791) can hold 65535 8-bit bytes (including the 20 bytes that are required for the IP header). Thus, after adding the transport layer and IP headers, the FCIP protocol will turn a stream of maximum-length Fibre Channel frames 10 into a series of 2168 byte IP datagrams. Even if the 40-byte optional IP header is utilized, each IP datagram will be only 2208 bytes in length and hence much smaller than the maximum size allowed for IP datagrams.

Once the IP datagrams are created, they are then passed over a physical network utilizing a data link protocol such as ATM, Frame Relay, Ethernet, or IEEE 802.3. In the typical environment, the IP datagrams are divided into Ethernet frames that have a maximum size of 1500 bytes (in other words, the maximum transmission unit or MTU of an Ethernet network is 1500 bytes). Thus, if an IP datagram containing a maximum sized Fibre Channel frame 10 is sent over an Ethernet connection, the 2168 byte IP datagram will be divided into two separate Ethernet frames. In most FCIP implementations, this means that after a single Fibre Channel frame 10 is converted into a single IP datagram, the datagram is then divided into one full Ethernet frame and one approximately half-full Ethernet frame. Even though the second Ethernet frame is smaller than the first frame, the overhead required for this half-empty frame to reach its final destination is generally the same as the full Ethernet frame. This utilization of half-empty Ethernet frames by the FCIP standard unfortunately reduces the efficiency of the FCIP connection. What is needed is a way to implement a Fibre Channel over IP that fully utilizes the available IP bandwidth.

SUMMARY OF THE INVENTION

The present invention overcomes the limitations in the prior art by providing a technique to efficiently transmit Fibre Channel frames over an Internet Protocol (IP) network. This is accomplished by combining multiple Fibre Channel frames together into a single IP datagram. This IP datagram is then fragmented into separate network frames, such as 1500 byte Ethernet frames. When the IP datagram arrives at the final destination, the segmented IP datagram is reconstructed, and the multiple Fibre Channel frames are extracted from the IP datagram and passed on to the recipient Fibre Channel network.

The present invention requires buffer memory in order to accumulate Fibre Channel frames. The buffer memory stores Fibre Channel frames received from the Fibre Channel network. Multiple Fibre Channel frames are accumulated in the buffer and then combined into a single IP datagram. In a 1500 byte MTU Ethernet network, it will be necessary to fragment this datagram into multiple 1500 byte Ethernet frames. However, while the prior art would often send a half-filled Ethernet frame for each full frame sent over the network, the present invention will more efficiently divide the IP datagram into multiple Ethernet frames.

When the FCIP data is received over the IP network, the Ethernet frames are stored in a buffer until the complete IP datagram can be reconstructed. The IP datagram is then divided back into the original Fibre Channel frames, which are sent out over the attached Fibre Channel network.

The number of Fibre Channel frames to be batched into a single IP datagram can be established through a variety of tests, such as total bytes of data, number of frames, or through a time-out mechanism. The values used for each of these tests can be set through theoretical analysis of a particular network, or through empirical study of prior performances of the present invention. These individual tests can be merged into a single algorithm capable of triggering the creation of an IP datagram using the currently batched Fibre Channel frames.

The present invention is implemented on a storage router that has a Fibre Channel interface for connecting with the Fibre Channel fabric and a network interface for connecting to an IP network. Fibre Channel frames received over the Fibre Channel interface are stored on a buffer within the storage router until a processor within the router determines that a Fibre Channel frame should be created. A transport and network layer object within the storage router creates an IP datagram out of the Fibre Channel frames stored in the router. The storage router then transmits the datagram over the network interface via a data link object. Data received from the network interface is likewise stored within a buffer memory until the entire IP datagram can be reconstructed. Once the IP datagram is reassembled, the multiple Fibre Channel frames within the datagram are sent over the Fibre Channel fabric via the storage router's Fibre Channel interface.

DETAILED DESCRIPTION OF THE INVENTION

Prior Art

Figure 2:
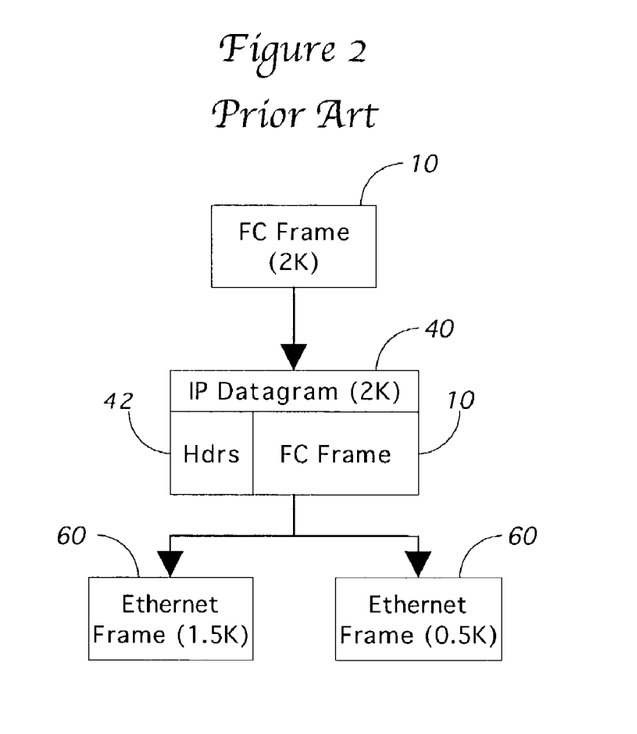
FIG. 2 is a schematic diagram illustrating Fibre Channel frame tunneling in prior art FCIP systems.

FIG. 2 shows the prior art relationship between Fibre Channel frames 10, Internet protocol datagrams 40 and data link level frames, such as Ethernet frames 60. To send a Fibre Channel frame 10 over an Internet network using Fibre Channel over IP technology, the frame 10 is "tunneled" through the network. In prior art FCIP implementations, this is accomplished by embedded each Fibre Channel frame 10 into a single IP datagram 40. The resulting IP datagram consists of headers 42 created by the transport layer (such as, but not exclusively, TCP) and the Internet protocol in combination with the embedded Fibre Channel frame 10. The IP datagram 40 is then sent over the physical network interface in the same manner as any other IP datagram 40. This means that the datagram 40 may be subject to fragmentation. Fragmentation is the process in which a single IP datagram 40 that is too large to be transported within a single data link frame 60 is divided into multiple frames. In FIG. 2, the IP datagram is larger than the frame size allowed in an Ethernet network, and is fragmented into two Ethernet frames 60. The multiple Ethernet frames 60 are then communicated over the physical network and then reassembled into the original IP datagram 40 at the receiving end.

A single Fibre Channel frame 10 can be up to approximately 2 kilobytes (KB) in size. In situations where the Fibre Channel frame 10 contains more than 1.5 KB, it is likely that the resultant IP datagram 40 will have to be fragmented during its delivery to its destination. This is because Ethernet and IEEE 802.3 frames each have an data payload size of approximately 1.5 KB (the actual MTU for Ethernet is 1500 bytes and for 802.3 is 1492 bytes), and a great deal of Internet protocol traffic travels over Ethernet or 802.3 networks. Thus, where the Fibre Channel frame 10 contains a full 2 KB data payload, the network layer will fragment the resulting IP datagram 40 into two Ethernet frames 60. One Ethernet frame 60 will contain approximately 1.5 KB of data from the Fibre Channel frame and the other Ethernet frame 60 will contain approximately 0.5 KB of data. Unfortunately, the network overhead required to send each Ethernet frame 60 to its final destination is generally the same even though one of the frames is more than half empty.

Figure 3:
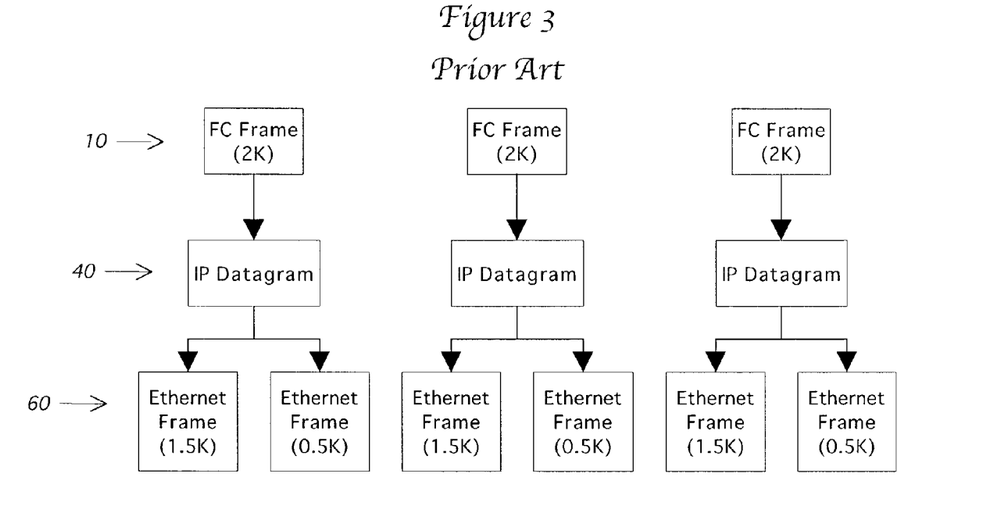
FIG. 3 is a schematic diagram of the prior art FCIP system of FIG. 2 tunneling three Fibre Channel frames into six Ethernet frames.

This inefficiency can significantly affect network performance, especially in data storage applications where a Fibre Channel sequence includes multiple Fibre Channel frames 10 that contain the maximum 2 KB of data. This situation is shown in FIG. 3, where three consecutive Fibre Channel frames 10 of 2 KB are to be transmitted over an Internet protocol network. Each Fibre Channel frame 10 is embedded into a separate IP datagram 40, each of which in turn is fragmented into two Ethernet frames 60. Hence, a total of six Ethernet frames 60 are required to transmit the 6 KB of data found in the three Fibre Channel frames 10.

Frame Batching

Figure 4:
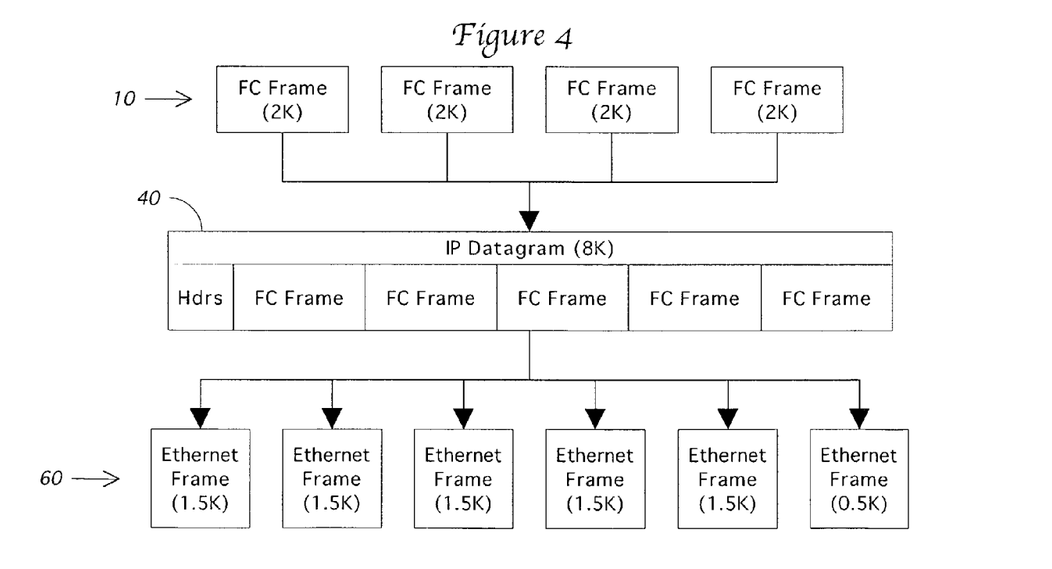
FIG. 4 is a schematic diagram of the present invention utilizing frame batching to combine four Fibre Channel frames into six Ethernet frames.

FIG. 4 shows how the present invention avoids the inefficiency of prior art FCIP implementations through the use of frame batching. In the present invention, it is not necessary to embed each Fibre Channel frame 10 into a separate IP datagram 40. Instead, multiple Fibre Channel frames 10 are stored in a buffer when received and then combined into a single IP datagram 40. Since an IP datagram can contain 65535 bytes according to RFC 791 (IPv4), it would be possible to combine up to 31 2112 byte Fibre Channel frames 10 into a single IP datagram 40.

In FIG. 4, four Fibre Channel frames 10 each having approximately 2 KB of data are combined into a single IP datagram 40. Since this datagram 40 contains approximate 8 KB of data, it is necessary to fragment this datagram into multiple Ethernet frames 60. In particular, six Ethernet frames 10 will be used to transmit the 8 KB of data received in the four Fibre Channel frames 10. Thus, even though the sixth Ethernet frame 60 in FIG. 4 is not fully utilized, a clear efficiency is obtained when compared with the prior art technique. In the prior art FCIP system of FIG. 3, six Ethernet frames 60 carry only 6 KB of data, while the present invention of FIG. 4 allows the same six Ethernet frames 60 to carry at least 8 KB of data.

Taking this efficiency further, it would not be unexpected for a single Fibre Channel sequence to contain many hundreds of kilobytes of data being transmitted by numerous Fibre Channel frames 10 each having approximately 2 KB of data. In this situation, the present invention could combine thirty-one of the Fibre Channel frames 10 into a single IP datagram 40. This datagram 40 would then be fragmented into forty-two full 1.5 KB Ethernet frames 60 and one partially full Ethernet frame 60. In contrast, the prior art FCIP implementations would convert those same thirty-one Fibre Channel frames 10 into sixty-two Ethernet frames 60. In this extreme case, the present invention would provide a greater than thirty percent increase in network efficiency.

Storage Router

Figure 5:
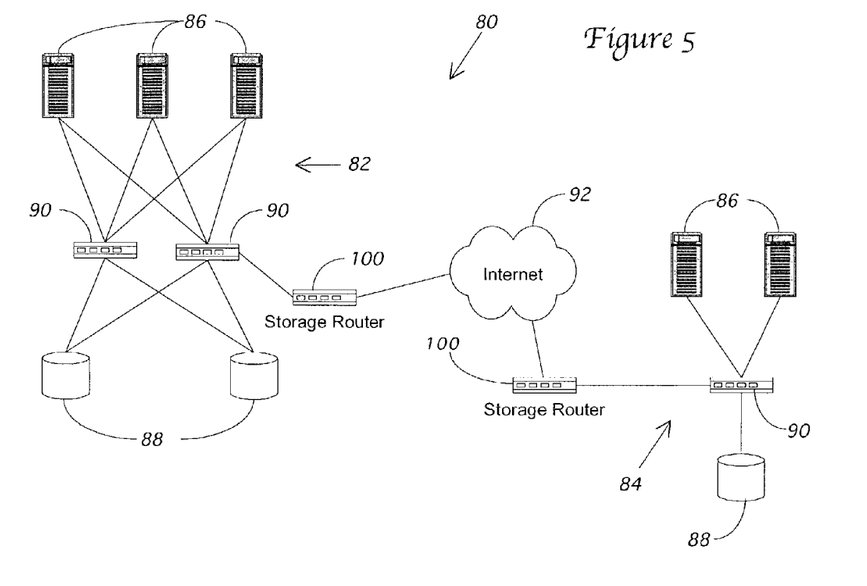
FIG. 5 is a network diagram showing two Fibre Channel storage area networks connected together over an Internet protocol network using two storage routers of the present invention.

FIG. 5 shows the environment in which the present invention is utilized. Two storage area networks 82, 84 are separately maintained in geographically distant locations. Each SAN 82, 84 is comprised of one or more host computers 86 communicating with storage devices 88 via Fibre Channel switches 90. In SAN 82, redundant Fibre Channel switches 90 ensure a path from each host 86 to each storage device 88 even if one of the switches were 90 to fail. When Fibre Channel hosts 86 and storage devices 88 are connected via Fibre Channel switches 90, as is the case in SANs 82 and 84, the topology is known as a Fibre Channel fabric.

The two Fibre Channel fabrics 82, 84 are connected to each other via an Internet protocol network 92 using a pair of storage routers 100. These routers 100 handle the tunneling of Fibre Channel frames 10 into IP datagrams 40 using a combination of standard FCIP techniques and the frame batching technology of the present invention. The present invention will focus on the new frame batching technology, since the basic FCIP techniques are well known in the prior art.

Figure 6:
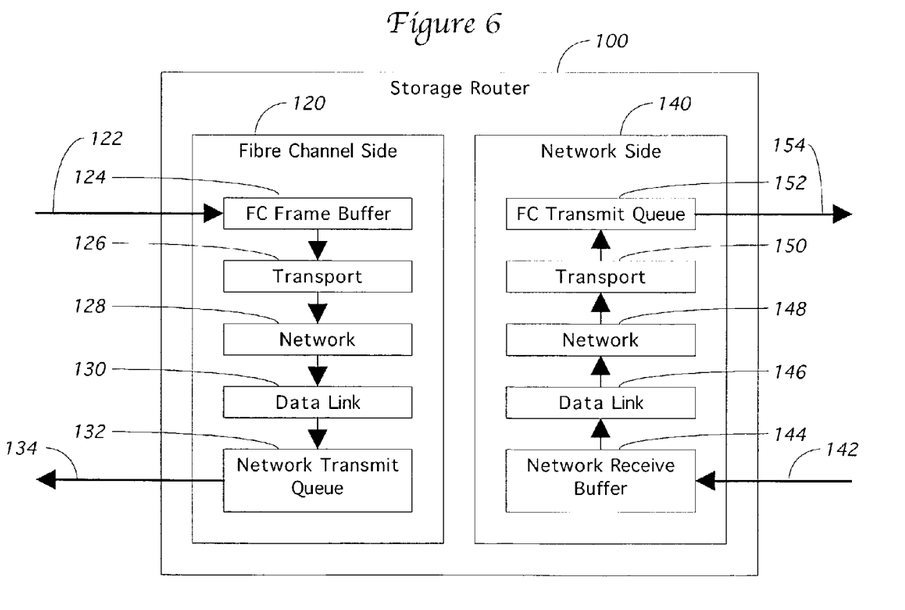
FIG. 6 is a schematic drawing of the logical elements in a storage router of the present invention.
Figure 7:
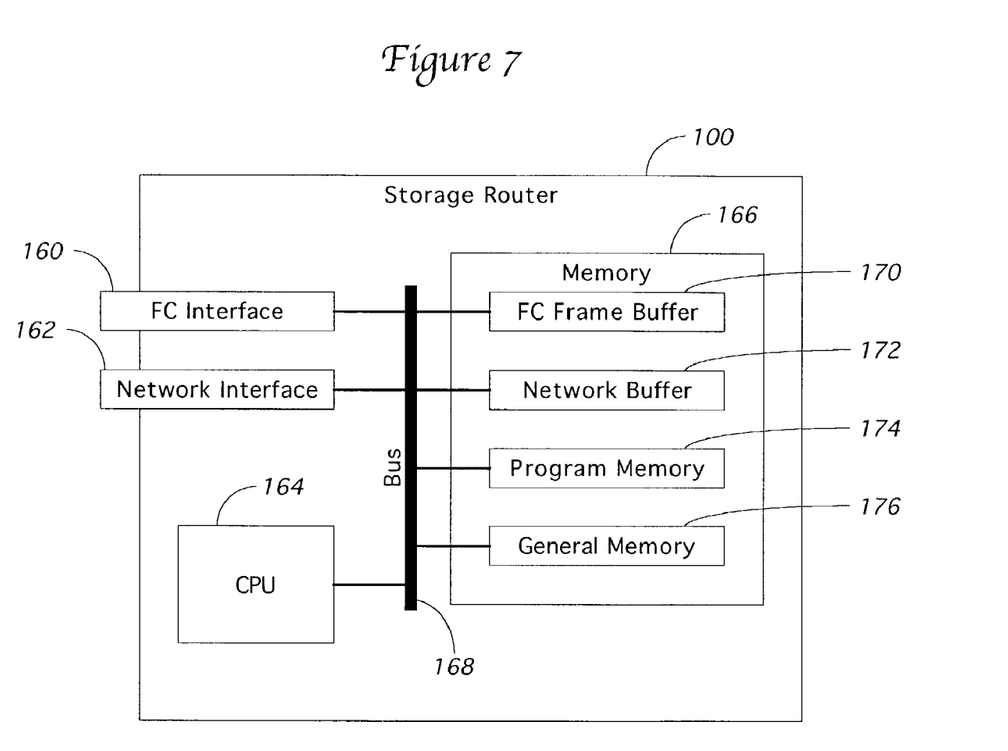
FIG. 7 is a schematic drawing of the major physical components of the storage router of FIG. 6.

The details of storage router 100 are shown in FIGS. 6 and 7. FIG. 6 divides the storage router 100 into two logical halves, a Fibre Channel side or object 120 that handles data received from the fiber channel fabric 82, 84 and a network side or object 140 that handles data received from the IP network 92. On the Fibre Channel side 120, the storage router 100 receives the incoming Fibre Channel frames 122 and stores the frames 122 in the Fibre Channel frame buffer 124. Multiple frames 122 are stored in the frame buffer 124 until sufficient data has been accumulated to form an IP datagram 40.

A processing unit in the storage router 100 makes the determination as to when the data in the buffer 124 will be grouped into an IP datagram 40. Various techniques can be used to make this determination, such as by counting the number of frames 10 in the buffer 124, totaling the total number of bytes in the buffer 124, or by accumulating data until a preset time period has expired. Other techniques would be obvious to one skilled in the art and are within the scope of the invention. Ideally, multiple techniques are used in conjunction with one another. One such combination would be to accumulate data until a set number of bytes or frames 10 have been received, while allowing a timer to time-out this waiting period if a predetermined period has expired without reaching the desired amount of data.

The number of Fibre Channel frames 10 transmitted in any one IP datagram 40 will depend upon the number of bytes contained within the Fibre Channel frames 10 themselves and the effective available bandwidth of the network 92. In short, more network bandwidth increases the number of Fibre Channel frames 10 that may be transmitted through the network in one IP datagram 40.

Once a sufficient number of Fibre Channel frames 10 has been accumulated in buffer 124, the sequence of frames 10 are passed to a transport object 126 that prepares the sequence for transmission by prepending a transport header to the sequence and thereby creating a transport datagram. The datagram is then passed to a network object 128, which prepends a network header, fragments the datagram into the appropriate number of network interface MTU sized packets, and passes them to the data link object 130. The data link object 130 then prepends a data link header on each fragment and queues the packet for transmission on the network transmit queue 132. From here, the data is transmitted out 134 over the Internet protocol network 92. The transport object 126, network object 128, and data link object 130 can be collectively referred to as networking objects. These objects 126-130 can be actual objects in an object-oriented programming paradigms, or can otherwise exist as software or firmware programming designed to achieve the functions of their respective networking layer.

Frames of data 142 from the Internet protocol network 92 are received on the logical network side 140 of storage router 100 and placed into the network receive buffer 144. Each frame is stripped of its data link and network headers by the data link 146 and network objects 148, and then reassembled into the original datagram. The transport object 150 then breaks down the datagram into the original Fibre Channel frames 10. The Fibre Channel frames 10 are then passed to the Fibre Channel transmit queue 152 for transmission 154 over a Fibre Channel network such as SAN 82 or 84.

FIG. 7 shows the main physical components of storage router 100. Interfacing with the Fibre Channel fabrics 82, 84 is accomplished by a Fibre Channel interface 160, which contains the hardware and processors necessary for interfacing with a Fibre Channel network 82, 84. Similarly, communications with the Internet protocol network 92 is accomplished by network interface hardware 162. These interfaces are in communication with central processing unit 164 and storage router memory 166 via a communications bus 168. FIG. 7 shows memory 166 containing a Fibre Channel frame buffer 170 and a network buffer 172, as well as program memory 174 and general memory 176. However, it is often advantageous to associate the Fibre Channel frame buffer 170 directly with the Fibre Channel interface 160, such as by using separate physical buffer memory in direct communication with the hardware of the Fibre Channel interface 160. Similarly, the network buffer 172 may share the separate physical buffer memory of the Fibre Channel frame buffer 170, or it might have its own physically separate buffer memory. While the particular configuration of memories may affect the general performance of moving data into and out of the buffers 170, 172, the actual physical relationship between the buffer memories 170, 172, the interfaces 160, 162, and the other memories 174, 176 is not directly relevant to the frame batching technology of the present invention.

The processor 164 is responsible for controlling the various components of storage router 100. Specifically, processor 164 is responsible for directing the creation of an IP datagram 40 when sufficient Fibre Channel data is stored in Fibre Channel frame buffer 170. This is accomplished by having the processor 164 run procedures stored in program memory 174 based upon data and parameters stored in general memory 176. Of course, while FIG. 7 shows a single central processor 164 controlling the storage router 100, it would be possible to divide the operations of this one processor 164 into multiple processors, and to locate certain processors directly on one or both of the interfaces 160, 162. In this way, the determination as to when an IP datagram 40 is to be constructed could be made from within one of the interfaces 160, 162.

Method

Figure 8:
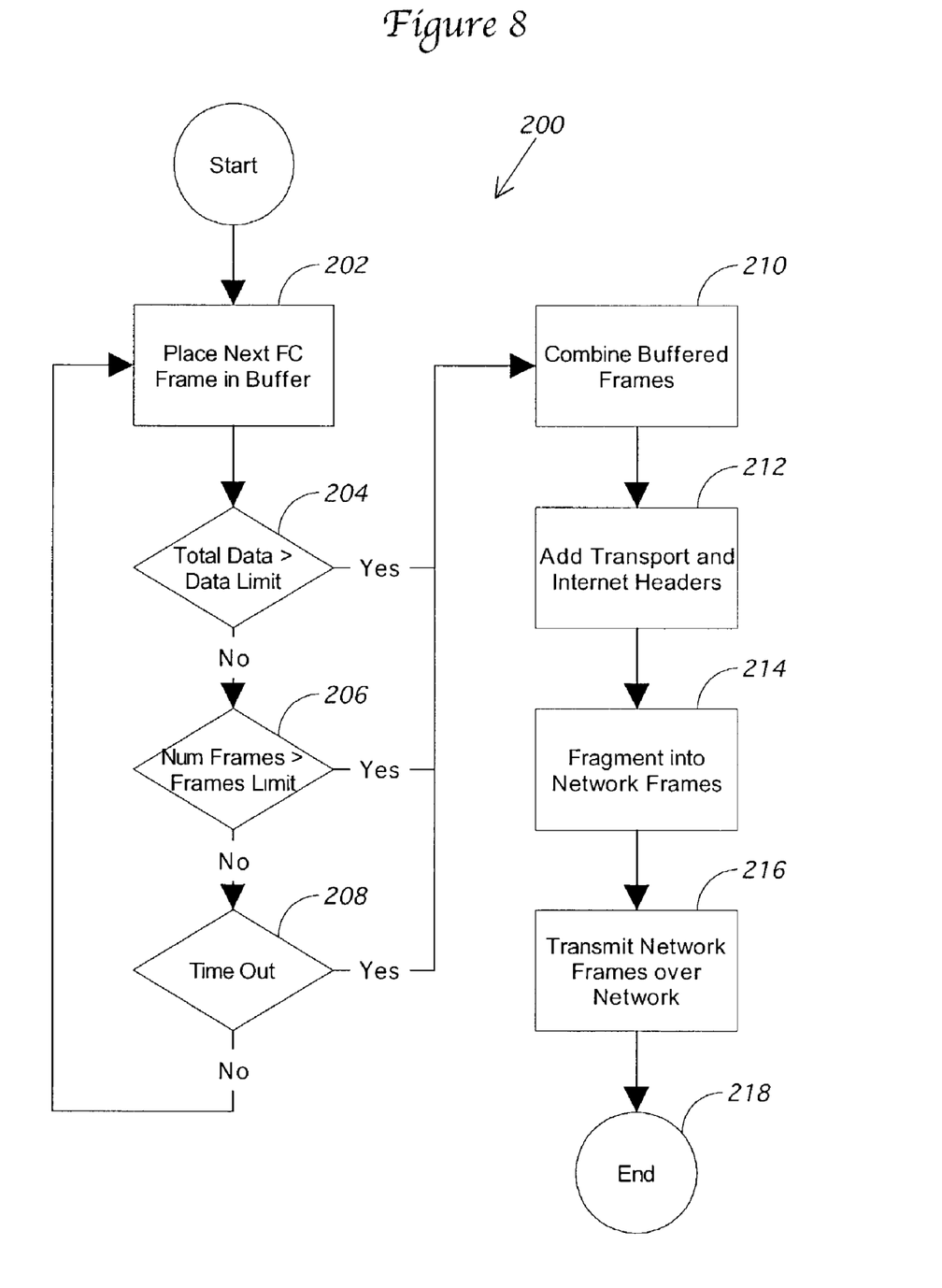
FIG. 8 is a flow chart showing the frame batching process of the present invention.

The method 200 of combining multiple Fibre Channel frames 10 into a single IP datagram 40 is shown on FIG. 8. The first step 202 of this method 200 is to place a single Fibre Channel frame 10 in the Fibre Channel frame buffer 170. Once this is done, it is necessary to determine whether it is now appropriate to form the IP datagram 40. This is accomplished via steps 204-208. Step 204 determines if the total amount of data in the Fibre Channel frame buffer 170 has exceeded a preset data limit. Similarly, step 206 determines if the number of frames 10 in Fibre Channel frame buffer 170 has exceeded the present frames limit. Finally, step 208 is responsible for determining whether the time out period has been exceeded since the last IP datagram 40 has been created. In the preferred embodiment, the data limit of step 204, the frames limit of step 206, and the time out period of step 208 are determined heuristically based on the actual performance of the IP network 92 and the components of the storage router 100. Each value should be set to maximize the bandwidth utilization of the IP network 92 without significantly increasing data latency.

If all of these steps 204-208 are calculated to be false, the method 200 simply places the next received frame 10 in the Fibre Channel frame buffer 170 at step 202. If any of these steps 204-208 calculates to a true value, the method 200 continues at step 210 by combining the frames 10 in Fibre Channel frame buffer 170 together into a single datagram 40. Step 212 adds the transport and Internet protocol headers. The resulting datagram is then fragmented into multiple network (or data link) frames 60 in step 214 according the MTU of the Internet protocol network 92. The network frames 60 are then transmitted over the network 92 at step 216. The method 200 of creating a single datagram ends at step 218, but in practice the method 200 will simply start over again repeatedly at step 202.

The above description implies that the Fibre Channel frame buffer 170 is emptied each time the buffered frames 10 are combined into a datagram in step 210. This is not a requirement of the present invention, as it would be a simple manner to simply place all incoming Fibre Channel frames 10 into the buffer 170, and then use steps 204, 206, and 208 to determine which subset of the frames 10 in buffer 170 are to be combined into the IP datagram 40.

The method for receiving data over the Internet protocol network 92 is essentially the reverse of method 200. Multiple network frames 60 are accumulated to recreate the IP datagram 40. Once the datagram 40 is reconstructed, the individual Fibre Channel frames 10 are extracted from the datagram 40 and sent out over the Fibre Channel network 82, 84.

The invention is not to be taken as limited to all of the above details, as modifications and variations may be made without departing from the spirit or scope of the invention. For instance, the above explanation described the storage router of the present invention in connection with Fibre Channel frames of a maximum size of approximately two kilobytes. In some environments, Fibre Channel frames are created with a lower maximum size, such as one kilobyte. The present invention is equally useful in this environment, since the prior art FCIP implementations would create a separate IP datagram 40 for each Fibre Channel frame 10. Although there would be no fragmentation in this environment since each IP datagram 40 would be less than the MTU of an Ethernet network, each Ethernet frame 60 would carry less than its maximum data payload (approximately 1 KB instead of 1.5 KB). With the present invention, multiple 1 KB Fibre Channel frames 10 would be combined into a single IP datagram 40, which would then be fragmented as necessary for the network's MTU as is shown in FIG. 4. In this way, most of the Ethernet frames 60 would carry their maximum data payload, thereby increasing the efficiency of the network.

In addition, the above description showed a specific logical and physical division of components in the storage router. It would be well within the scope of present invention to alter the logical and physical divisions of these components without altering the fundamental process of the present invention. Also, the method of Figure shows three particular tests being used to determine when the Fibre Channel frames 10 in Fibre Channel frame buffer 170 are to be combined into an IP datagram 40. One or more of these tests could be removed or altered, or additional tests could be added to the method and still be within the contemplated scope of the present invention. As the above examples illustrate, the invention should not be limited by the specifics of the above description, but rather should be limited only by the following claims.

What is claimed is:

1. A method for transmitting Fibre Channel frames from a Fibre Channel network at a first location to a Fibre Channel network at a second location over an Internet protocol network comprising the steps of:
  a) receiving a plurality of Fibre Channel frames from the Fibre Channel network at the first location;
  b) combining the plurality of Fibre Channel frames into a single datagram;
  c) adding transport and IP headers to the single datagram;
  d) fragmenting the single datagram into a plurality of data link level frames;
  e) transmitting the data link level frames from the first location over the Internet protocol network;
  f) receiving the data link level frames from the Internet protocol network at the second location;
  g) combining the data link level frames back into the single datagram;
  h) extracting the plurality of Fibre Channel frames from the single datagram; and
  i) transmitting the plurality of Fibre Channel frames over the Fibre Channel network at the second location.

2. The method of claim 1, wherein step a) further comprises the sub-step of storing the plurality of Fibre Channel frames on a Fibre Channel frame buffer.

3. The method of claim 1, wherein step b) further comprises:
  i) tracking the number of Fibre Channel frames received since the last datagram was created;
  ii) combining the Fibre Channel frames received since the last datagram was created when the tracked number of Fibre Channel frames exceeds a frames limit value.

4. The method of claim 3, wherein the frames limit value is set heuristically to maximize data throughput over the Internet protocol network.

5. The method of claim 3, wherein the frames limit value is set heuristically to balance maximizing data throughput over the Internet protocol network without significantly increasing data latency.

6. The method of claim 1, wherein step b) further comprises:
   i) tracking the amount of data in the Fibre Channel frames received since the last datagram was created;
   ii) combining the Fibre Channel frames received since the last datagram was created when the tracked amount of data exceeds a data limit value.

7. The method of claim 1, wherein step b) further comprises:
   i) tracking the amount of time since the last datagram was created;
   ii) combining the Fibre Channel frames received since the last datagram was created when the tracked amount of time exceeds a time limit value.

8. A storage router comprising:
   a) a Fibre Channel interface that receives Fibre Channel frames from a Fibre Channel network;
   b) a Fibre Channel frame buffer memory that stores Fibre Channel frames received by the Fibre Channel interface;
   c) a network interface in communication with the Fibre Channel frame buffer memory and with an Internet protocol network;
   d) a processor that causes a single datagram to be formed from a plurality of received Fibre Channel frames stored on the Fibre Channel frame buffer memory;
   e) at least one networking object that adds transport and IP headers to the single datagram and fragments the datagram into a plurality of data link frames appropriate for transmission over the Internet protocol network via the network interface.

9. The storage router of claim 8, wherein the Internet protocol network has a maximum transmission unit (MTU) value, and the Fibre Channel frames have a maximum size value that is greater than the MTU value.

10. The storage router of claim 9, wherein the plurality of received Fibre Channel frames are fewer in number than the plurality of data link frames.

11. The storage router of claim 8, wherein the Internet protocol network has a maximum transmission unit (MTU) value, and the Fibre Channel frames have a maximum size value that is smaller than the MTU value.

12. The storage router of claim 9, wherein the plurality of received Fibre Channel frames are greater in number than the plurality of data link frames.

* * * * *